United States Patent
Ariga

[15] 3,689,905
[45] Sept. 5, 1972

[54] HIGH-FREQUENCY INDUCTANCE TYPE APPARATUS FOR DETECTING SLIGHT MOVEMENT

[72] Inventor: Shinichiro Ariga, 3-3, 3-chome, Ojima Hancho, Nagaoka-shi, Niigata-ken, Japan

[22] Filed: June 1, 1971

[21] Appl. No.: 148,449

[30] Foreign Application Priority Data

June 1, 1970   Japan..................45/47311

[52] U.S. Cl.............340/199, 340/177 CA, 318/657
[51] Int. Cl. ............................................G08c 19/00
[58] Field of Search.......340/199, 196, 195, 177 CA; 318/656, 657; 324/34 PS, 34 D

[56] References Cited

UNITED STATES PATENTS

| | | |
|---|---|---|
| 2,494,579 | 1/1950 | Pimlott et al. ..............340/199 |
| 2,827,787 | 3/1958 | Kroeger.....................340/199 |
| 3,046,533 | 7/1962 | Torn et al..................340/199 |

Primary Examiner—John W. Caldwell
Assistant Examiner—Robert J. Mooney
Attorney—Waters, Roditi, Schwartz & Nissen

[57] ABSTRACT

A movement detecting device with a power transformer coupled to a high-frequency signal source. Supplemental windings are connected to the secondary of the power transformer and to respective coils. Two high-frequency transformers include primaries connected in respective closed loops with the supplemental windings and coils and secondaries which are coupled to a meter. The coils are wound on a common tube in which there is a movable core. The meter is part of a common leg in two further closed loops which include variable resistors or inductors and transistors.

9 Claims, 4 Drawing Figures

INVENTOR
Shinichiro Ariga

INVENTOR
Shinichiro Ariga

HIGH-FREQUENCY INDUCTANCE TYPE APPARATUS FOR DETECTING SLIGHT MOVEMENT

BACKGROUND

1. FIELD OF INVENTION

This invention relates to high-frequency inductance type devices for detecting slight movements.

2. PRIOR ART

Devices of the above kind are generally known. They are constructed in such a manner that a movable magnetic member thereof is attached to a movable member, for example, a free end of a Bourdon tube so that a slight movement of the tube end caused by a pressure change can be remotely and electrically detected.

With the hitherto known apparatus of this kind, however, for obtaining stability and high sensitivity, there are used a high-grade amplifier, a stabilizer, a feedback means and other supplemental components. Accordingly, such devices are high in price and complicated in structure. Moreover, substantial labor is required for the maintenance and adjustment thereof. Additionally, even when using parts of high reliability, a large number of such parts are needed. Statistically, this results in increased trouble.

SUMMARY OF INVENTION

This invention has as an object the avoidance of the above defects and the provision of an apparatus which is simple in construction and uses a very small number of highly reliable parts and which has a substantial output without requiring an amplifier or the like, is generally trouble free, has a high reliability, and has very easy zero-point and sensitivity adjustments.

According to the invention, a power transformer, which has its primary winding connected to a high frequency electric source, has its secondary winding connected to the primary windings (connected in series with each other) of two high-frequency transformers. The opposite end terminals of the secondary winding of the power transformer are extended to form subsidiary windings, and two coils connected in series one to another and wound differentially on an insulating tube containing a movable core therein are connected between the opposite ends of the foregoing subsidiary windings. A junction between the coils and a junction between the primary windings of the high-frequency transformers are interconnected, and the secondary windings of the two high-frequency transformers are connected to respective transistors each being arranged to become conductive during positive half-waves. The output currents of these transistors are differentially tapped out.

Examples of the invention will next be explained with reference to the accompanying drawings.

DETAILED DESCRIPTION

Figure 1:
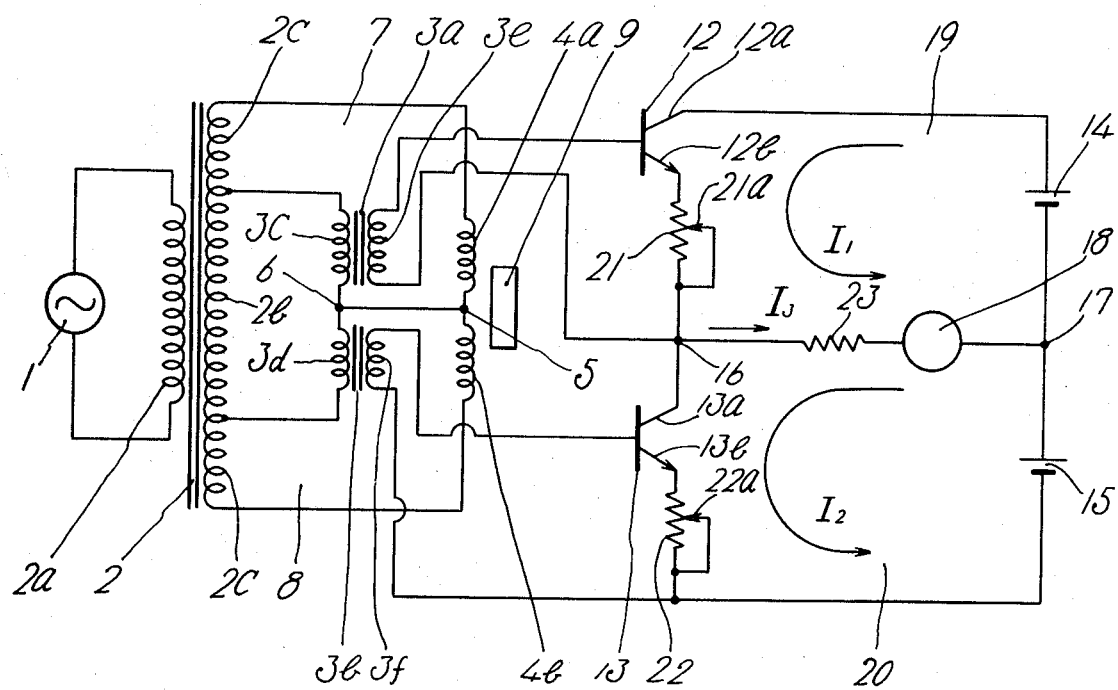
FIG. 1 is a schematic diagram of one embodiment of the invention.

FIG. 1 shows one example of this invention. Element 1 is a high-frequency electric source with a frequency of the order of 1 MHz. This source is connected between the opposite end terminals of a primary winding 2a of a power transformer 2. Two high-frequency transformers 3a and 3b have their primary windings 3c and 3d connected in series with one another and connected between the opposite end terminals of the secondary winding 2b.

The opposite end terminals of the secondary winding 2b are extended to form subsidiary windings 2c. Two coils 4a and 4b, connected in series with one another, are interposed between the opposite outer end terminals of the subsidiary windings 2c. A junction 5 between the coils 4a and 4b and a junction 6 between the primary windings 3c and 3d of the high-frequency transformers 3a and 3b are interconnected. Thus, a first closed circuit 7 comprising the winding 2c, the coil 4a and the primary winding 3c and a second closed circuit 8 comprising the winding 2c, the coil 4b and the primary winding 3d are formed.

Figure 2:
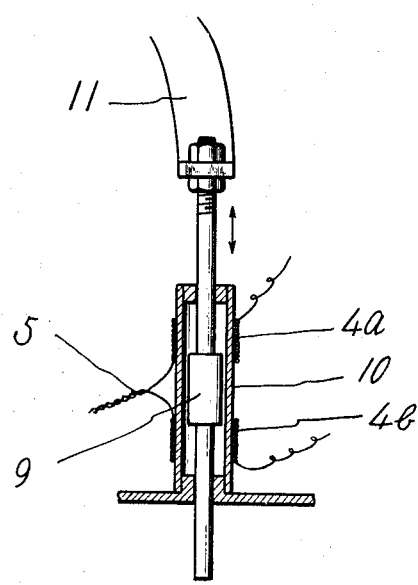
FIG. 2 is a sectional side view of a movable member employed in the circuit of FIG. 1.

The coils 4a and 4b are wound above or below one another on the periphery of an insulating tube 10 (FIG. 2) containing a movable core 9 thereon. Upon movement of the movable core 9, the reactances of the coils 4a and 4b are differentially increased and decreased. If the movable core 9 is positioned at the middle point between the two coils 4a and 4b, the electric currents flowing through the closed circuits 7 and 8 are equal to one another. If the movable core 9 is moved, for instance, towards the coil 4b, the reactance of the coil 4a is decreased and the reactance of the coil 4b is increased. This results in that the electric current through the closed circuit 7 is increased and the electric current through the circuit 8 is decreased.

Part 11 is an end of a movable member such as that of a Bourdon tube. It is attached to the movable core 9.

The secondary windings 3e and 3f of the high-frequency transformers 3a and 3b are connected to respective transistors 12 and 13 each being arranged to become conductive when a positive half-wave voltage is applied thereto. The circuitry is also arranged so that the output currents of these transistors are differentially tapped out.

In the embodiment of FIG. 1, the secondary windings 3e and 3f are respectively connected at one end to the bases of the corresponding transistors 12 and 13. Two direct-current sources 14 and 15, connected in series with one another, are connected between the collector terminal 12a of transistor 12 and the emitter terminal 13b of the other transistor 13. A junction 16 between the emitter terminal 12b of the transistor 12 and the collector terminal 13a of the transistor 13 is connected to a junction 17 between the direct-current electric sources 14 and 15 by a load resistor 23 and electric-current detecting device 18. This forms closed output circuits 19 and 20.

The detecting device 18 may be either remotely arranged, for instance, to enable effecting a control of the movable member side remotely or may be constructed as illustrated in the form of an ampere meter for indicating amount of movement of the movable member.

Elements 21 and 22 are variable resistors interposed in the respective independent output circuits. For instance, they are connected in the emitter circuits of the transistors 12 and 13, so that sensitivity and zero-point adjustments can be simply made by adjusting their slidable members 21a and 22a as will be explained in detail hereinafter. The two transistors 12 and 13 are each an NPN transistor arranged to become conductive by application of a positive half-wave to the base terminal thereof and to become nonconductive during a negative half-wave.

When the movable core 9 is positioned at the middle point between the coils 4a and 4b, the electric currents flowing through the closed circuits 7 and 8 are equal to one another as mentioned before, so that the electric voltages applied to the base terminals of the transistors 12 and 13 are equal to one another. In this event, electric currents $I_1$ and $I_2$ are equal to one another and flow through the detecting side closed-circuits 19 and 20 as shown by arrows in FIG. 1. The difference between the two currents $I_1$ and $I_2$ in the circuit of the detecting device 18 at this time is zero, and it is indicated by the detecting device 18 that the amount of movement of the movable core 9 is zero.

If, then, the movable core 9 is moved towards the coil 4b side, the reactance of the coil 4a is decreased and the reactance of the coil 4b is increased as mentioned before. The input to the base terminal of the transistor 12 is increased and the input to the base terminal of the transistor 13 is decreased. Thereby, the electric current $I_1$ through the closed circuit 19 is increased and the electric current $I_2$ through the closed circuit 20 is decreased. Thus, an electric current $I_3$, which is the difference therebetween, flows through the circuit of the detecting device 18 and an indication corresponding to the amount of movement of the movable core 9 is indicated on the detecting device 18.

In a preferred embodiment, the high-frequency electric source has an output voltage of 10 V and of 1 MHz. Direct-current sources 14 and 15 of 15 V each are used. A reading of 10 mA is indicated on the detecting device 18 when the movable core 9 is moved 1.5 mms.

The electric current flowing through the detecting device 18 can be varied in value depending on adjustment of the variable resistors 21 and 22 and the value of the load resistor 23 and so forth. The variable resistors 21 and 22 serve to effect the zero adjustment and the sensitivity or output adjustment of the electric current flowing through the detecting device 18 as mentioned before. The zero-point adjustment is effected in that the electric currents $I_1$ and $I_2$ flowing through the closed circuits 19 and 20 are made equal by individually varying the values of the variable resistors 19 and 20. The sensitivity adjustment is effected in that the electric currents $I_1$ and $I_2$ flowing through the closed circuits 19 and 20 are increased and decreased by increasing and decreasing the resistance values of the variable resistances 21 and 22. These adjustments, especially, the zero-point adjustment are ordinarily very difficult to do and highly accurate variable resistors are usually required. However, a highly accurate one is large in size and a simple one as generally marketed is unsuitable for use.

According to another aspect of this invention, the difficulty in adjustments can be further removed and an even more simple construction of high accuracy obtained. An example thereof will next be explained with reference to FIGS. 3 and 4.

Figure 3:
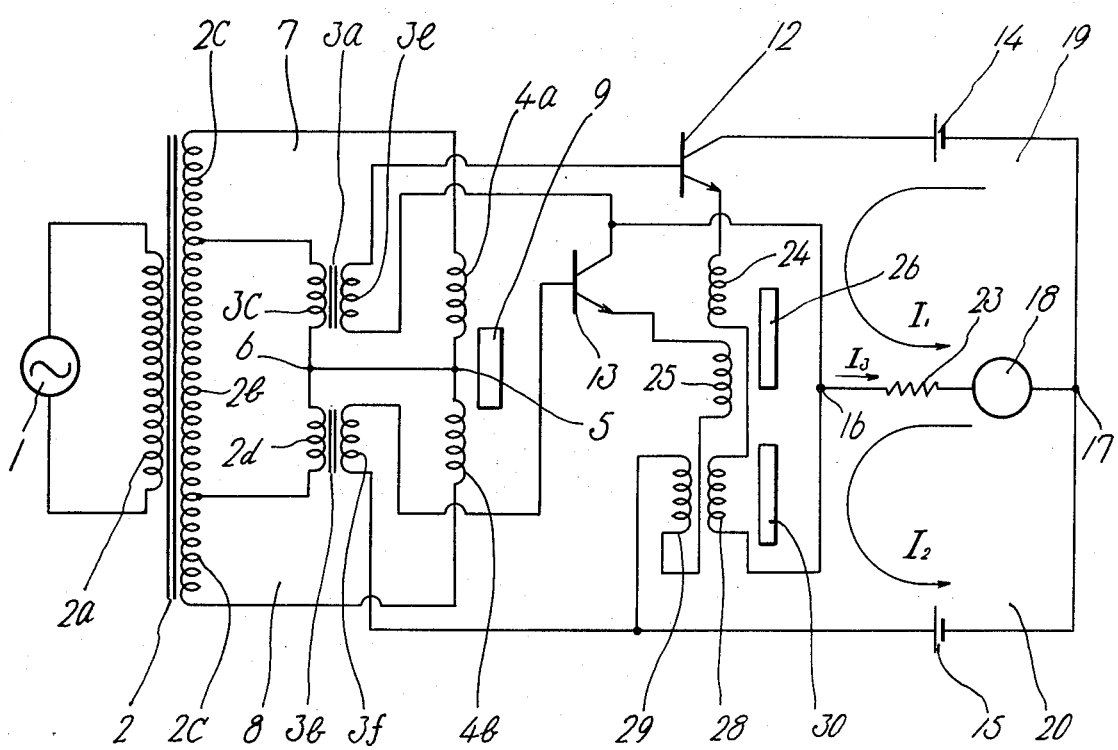
FIG. 3 is a schematic diagram of another embodiment of the invention.

Two coils or coil sections 24 and 25 are respectively interposed in series in the individual output circuits of the aforementioned transistors 12 and 13 shown in FIG. 3. These two coils 24 and 25 are wound, in parallel to one another and in the same direction, on the periphery of a single common insulating tube 27 having a movable core 26 therein, whereby there is formed the zero-point adjusting mechanism. If the movable core 26 is moved towards the coil 24 side, the reactance of the coil 24 is increased and the reactance of the other coil 25 is decreased. In this event, the current $I_1$ in the closed circuit 19 is decreased and the current $I_2$ in the other closed circuit 20 is increased. If the movable core 26 is moved towards the coil 25 side, the current $I_1$ in the closed circuit 19 is increased and the current $I_2$ in the other closed circuit 20 is decreased. Thus, adjustment of the current flowing through the detecting device 18 and, as a result, the zero-point can be simply effected by adjusting the single movable core 26.

Figure 4:
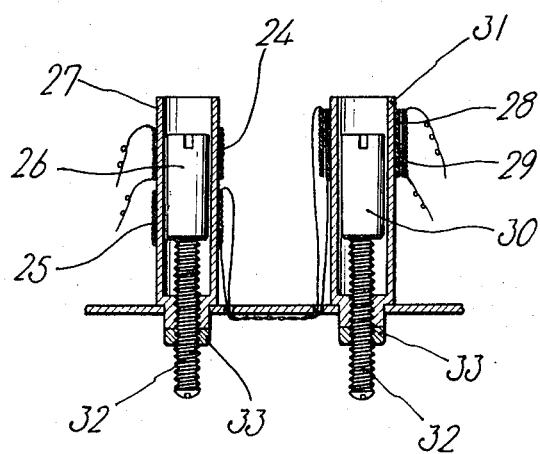
FIG. 4 is a sectional side view of a zero-point adjusting mechanism and sensitivity adjusting mechanism employed in the circuit of FIG. 3.

Additionally, coils or coil sections 28 and 29 are respectively interposed in series in the individual output circuits of the foregoing transistors 12 and 13 as shown in FIG. 3. These coils 28 and 29 are wound, in opposite directions and in superimposed relationship, on the periphery of a single common insulating tube 31 having a movable core 30 therein as shown in FIG. 4, whereby there is formed the sensitivity adjusting mechanism. In this arrangement, there is caused a magnetic flux in relation to the difference current I between the currents $I_1$ and $I_2$ flowing through the closed circuits 19 and 20 and a reactance corresponding thereto is caused. If the movable core 30 is inserted further into the coils 28 and 29, the reactance is increased and the output sensitivity, that is, the output current is decreased. If the insertion is decreased, the reactance is decreased and the output current is increased. Thus, the detecting device 18 can be simply adjusted to be of any desired sensitivity.

As, in the zero-point adjusting mechanism, the coils 24 and 25 are wound in the same direction as mentioned before, there is hardly any magnetic flux in relation to the difference current I between the current $I_1$ and $I_2$ of the closed circuits 19 and 20. Accordingly, the movement of the movable core 26 has hardly any influence on the output current I, so that the zero-point adjustment and the sensitivity adjustment can be simply effected independently. Elements 32 are screw rods each supporting the corresponding movable core 26 and 30, and being fixed at their proper advance positions by the fastening of a nut 33.

Thus, according to this invention, an accurate high-output apparatus can be obtained by using economical, simple and highly reliable parts, without involving high costs or complicated components such as high-grade amplifiers, stabilizers and other such components. The zero-point adjusting mechanism and the sensitivity adjusting mechanism can be accurately and very simply adjusted and can be obtained economically by constructing these as variable reactance devices. Additionally, the variable reactance portion can be made very small in size and the apparatus as a whole can be of small size.

What is claimed is:

1. A movement detecting apparatus comprising a source of a high-frequency electrical signal, power transformer including a primary winding connected to said source and a secondary winding, supplemental windings coupled serially to opposite extremities of said secondary winding, two high-frequency transformers including respective primary and secondary windings, a first junction connecting the latter said primary windings in series, the latter said primary windings being connected across the secondary winding of the power transformer, first and second coils, a second junction connecting said coils and being connected to said first junction, said coils being further connected to respective of said supplemental windings so that two closed loops are formed each including one said supplemental winding, one said coil and one of the primary windings of the high-frequency transformers, means coupled to the secondary windings of the high-frequency transformers to indicate an electric current, a tube whereon the coils are differentially wound, and a core displaceable in the tube in accordance with said movement.

2. Apparatus as claimed in claim 1 wherein the coils are axially spaced on said tube.

3. Apparatus as claimed in claim 2 wherein said means includes first and second transistors coupled to respective of the secondary windings of the high-frequency transformers, voltage sources connected to the transistors whereby the latter are limited to conduction during positive half-waves received from the high-frequency transformers, and a meter coupling the transistors and voltage sources in respective closed loops.

4. Apparatus as claimed in claim 3 wherein each transistor includes an emitter, collector and base whereof the base is coupled to the corresponding high-frequency transformer.

5. Apparatus as claimed in claim 4 comprising a variable resistor in each of the latter said loops.

6. Apparatus as claimed in claim 4 comprising coils in each of the latter said loops and each having a variable inductance.

7. Apparatus as claimed in claim 6 wherein each of the latter said coils includes first and second sections coupled serially with the emitter of the corresponding transistor, a tube supporting said first sections in axially spaced relation thereon with the first sections being wound in the same direction, a tube supporting said second sections with one superposed on the other and with the second sections wound in opposite directions, and adjustable cores in the latter said tubes.

8. Apparatus as claimed in claim 4 comprising a load resistor in series with said meter.

9. Apparatus as claimed in claim 4 comprising means to couple said core to the source of said movement.

* * * * *